United States Patent [19]
Kang et al.

[11] Patent Number: 5,516,359
[45] Date of Patent: May 14, 1996

[54] INTEGRATED HIGH TEMPERATURE METHOD FOR OXYGEN PRODUCTION

[75] Inventors: Doohee Kang, Macungie; Rajagopalan S. Srinivasan, Allentown, both of Pa.; Robert M. Thorogood, Cary, N.C.; Edward P. Foster, Wescosville, Pa.

[73] Assignee: Air Products and Chemicals, Inc., Allentown, Pa.

[21] Appl. No.: 428,611

[22] Filed: Apr. 25, 1995

Related U.S. Application Data

[63] Continuation-in-part of Ser. No. 168,988, Dec. 17, 1993, abandoned.

[51] Int. Cl.⁶ .......................... B01D 53/22; B01D 71/02
[52] U.S. Cl. .......................... 95/14; 95/18; 95/54
[58] Field of Search .................. 95/14, 17, 18, 95/39–42, 45, 54; 204/129

[56] References Cited

U.S. PATENT DOCUMENTS

| | | | |
|---|---|---|---|
| 4,545,787 | 10/1985 | Hegarty | 55/16 |
| 4,560,394 | 12/1985 | McDonald et al. | 95/54 |
| 5,035,727 | 7/1991 | Chen | 55/16 |
| 5,108,465 | 4/1992 | Bauer et al. | 95/54 |
| 5,118,395 | 6/1992 | Chen et al. | 204/59 |
| 5,160,618 | 11/1992 | Burggraaf et al. | 210/490 |
| 5,160,713 | 11/1992 | Mazanec et al. | 95/54 X |
| 5,169,415 | 12/1992 | Roettger et al. | 95/54 |
| 5,174,866 | 12/1992 | Chen et al. | 204/59 |
| 5,240,473 | 8/1993 | Carolan et al. | 95/54 |
| 5,245,110 | 9/1993 | Van Dijk et al. | 585/946 |

FOREIGN PATENT DOCUMENTS

WO93/06041 4/1993 WIPO.

OTHER PUBLICATIONS

Wright, J. D., Copeland, R. J., "Advanced Oxygen Separation Membranes", Report No. TDA-GRI-90/0303, prepared for the Gas Research Institute, Sep. 1990.

Clark, D. J. et al, "Separation of Oxygen by Using Zirconia Solid Electrolyte Membranes" in *Gas Separation and Purification* 1992, vol. 6, No. 4, pp. 201–205.

Dharmadhikari, S., "Understanding Gas Turbine Cycles" in *The Chemical Engineer*, 28 Jan. 1993, pp. 17–20.

*Primary Examiner*—Robert Spitzer
*Attorney, Agent, or Firm*—John M. Fernbacher

[57] ABSTRACT

Oxygen is separated from air by a high temperature ion transport membrane which is integrated with a gas turbine system for energy recovery from the membrane nonpermeate stream. Air is compressed, heated in a first heating step, and passed through the feed side of a mixed conductor membrane zone to produce a high purity oxygen product on the permeate side of the membrane zone. Nonpermeate gas from the membrane zone is heated in a second heating step and passed through a hot gas turbine for power recovery. The operating temperatures of the membrane zone and the expansion turbine are independently maintained by controlling the rate of heat addition in the first and second heating steps, whereby the membrane zone and expansion turbine are thermally delinked for maximum oxygen recovery efficiency.

23 Claims, 5 Drawing Sheets

INTEGRATED HIGH TEMPERATURE METHOD FOR OXYGEN PRODUCTION

This application is a continuation-in-part of U.S. Ser. No. 08/168,988 filed Dec. 17, 1993, now abandoned.

FIELD OF THE INVENTION

The invention pertains to the recovery of oxygen by a high temperature ion transport membrane system, and in particular to heat integration of a mixed conductor membrane system with a hot gas expansion turbine.

BACKGROUND OF THE INVENTION

Oxygen is an economically important gas which is widely used in large-scale industrial applications. New uses for oxygen are emerging in advanced high-temperature processes for iron and steel manufacture, coal gasification, oxygen-enriched combustion, and in particular integrated gasification combined cycle power generation. In these large-scale applications, the cost of oxygen produced by conventional cryogenic or noncryogenic technology is a major portion of the overall operating cost, and lower oxygen cost will encourage the commercialization of these emerging technologies. New oxygen separation processes which can be thermally integrated with these advanced high-temperature processes will reduce the energy consumed in oxygen production, which in turn will promote the technical and commercial development of such integrated systems.

Oxygen can be recovered from air at high temperatures by inorganic oxide ceramic materials utilized in the form of selectively permeable nonporous ion transport membranes. An oxygen partial pressure differential or a voltage differential across the membrane causes oxygen ions to migrate through the membrane from the feed side to the permeate side where the ions recombine to form electrons and oxygen gas. An ion transport membrane of the pressure-driven type is defined herein as a mixed conductor membrane, in which the electrons simultaneously migrate through the membrane to preserve internal electrical neutrality. An ion transport membrane of the electrically-driven type is defined herein as a solid electrolyte membrane in which the electrons flow from the permeate side to the feed side of the membrane in an external circuit driven by a voltage differential. A comprehensive review of the characteristics and applications of ion transport membranes is given in a report entitled "Advanced Oxygen Separation Membranes" by J. D. Wright and R. J. Copeland, Report No. TDA-GRI-90/0303 prepared for the Gas Research Institute, September 1990.

In the recovery of oxygen from air at high temperatures (typically 700° C. to 1100° C.) using ion transport membranes, a significant amount of heat energy is available in the membrane permeate and non-permeate streams. The effective use of this energy in the overall operation of an ion transport membrane system is necessary if the system is to be competitive with conventional cryogenic technology for large scale oxygen production. Energy recovery and effective utilization thereof is possible by the integration of compressors, combustors, hot gas turbines, steam turbines, and heat exchangers with the mixed conductor membrane module. U.S. Pat. No. 4,545,787 discloses the production of oxygen and net power in the integrated operation of a mixed conductor ceramic membrane. Air is compressed, heated, and passed through a membrane separator to produce an oxygen permeate and an oxygen-containing non-permeate stream. The non-permeate stream is combusted with a fuel and the hot combustion gases are expanded in a hot gas turbine. The turbine provides shaft power for the compressor and drives a generator for export of electricity, and turbine exhaust is optionally used to cogenerate steam or to preheat the compressed air membrane feed. Alternately, the membrane is placed downstream of the combustion step.

U.S. Pat. No. 5,035,727 describes the recovery of oxygen by a solid electrolyte membrane in conjunction with an externally-fired gas turbine in which compressed air is heated indirectly and passed through the membrane module. Non-permeate gas is expanded through a hot gas turbine, the turbine exhaust is heated by direct combustion, and the combustion products provide heat indirectly to the membrane feed. Steam is recovered from the waste heat after heat exchange with the membrane feed.

U.S. Pat. No. 5,118,395 describes the recovery of oxygen from gas turbine exhaust utilizing a solid electrolyte membrane with the coproduction of electric power and steam. A supplemental burner heats the turbine exhaust prior to the membrane, and steam is generated by the membrane non-permeate stream. Related U.S. Pat. No. 5,174,866 discloses a similar system in which intermediate turbine exhaust is passed through the membrane and the membrane non-permeate stream is further expanded through another turbine stage. In both patents, turbine shaft power is used to drive the air compressor and an electric generator.

The report by J. D. Wright and R. J. Copeland identified above discloses at p. 55 a gas turbine-driven ceramic membrane system in which air is compressed, heated indirectly in a fired heater, and passed through the membrane to yield oxygen and non-permeate gas. The non-permeate gas is combusted with natural gas in the fired heater and the combustion products are expanded through a hot gas turbine to drive the compressor and generate electric power. Heating of the air feed to the membrane and the combustion of fuel and non-permeate gas prior to the turbine thus are accomplished in a single integrated combustion chamber.

U.S. Pat. No. 5,245,110 (equivalent to PCT International Publication No. WO 93/06041) discloses the integration of a gas turbine with an oxygen-selective membrane system. The permeate side of the membrane is swept with air to yield an enriched air product containing about 35 vol % oxygen. The enriched air product is used in a hydrocarbon reformer or gasifier process, and tail gas from the reformer or gasifier is introduced into the gas turbine combustor to balance the flow of hot gas to the turbine. The nitrogen from the permeate and membrane sweep air replaces the mass lost when oxygen is consumed in the reformer or gasifier process, which maintains the turbine in a desired mass and thermal balance.

An article entitled "Separation of Oxygen by Using Zirconia Solid Electrolyte Membranes" by D. J. Clark et al in Gas Separation and Purification 1992, Vol. 6, No. 4, pp. 201–205 discloses an integrated coal gasification-gas turbine cogeneration system with recovery of oxygen for use in the gasifier. Membrane non-permeate is combusted with gas from the gasifier and passed to the gas turbine cogeneration system.

A combined cycle power generation system is a highly efficient system which utilizes a gas turbine to drive an electric generator, wherein heat is recovered from the turbine exhaust as steam which drives an additional electric generator. A description of typical combined cycle power generation systems is given in The Chemical Engineer, 28 Jan. 1993, pp. 17–20. The compressor, combustor, and expansion turbine are carefully designed and integrated to maximize the efficiency of each component and thus the efficiency of the integrated system. Preferably these systems are operated at steady-state design conditions, since significant deviations from these conditions will adversely affect system efficiency.

The successful development and commercialization of oxygen production by ion transport membranes will require flexible systems which maximize energy utilization and allow operation of system components at optimum conditions. In addition, the integration of such systems with an available heat source and heat sink, such as a gas turbine power generation system, is highly desirable. The invention disclosed below and described in the following claims advances the art and provides improved methods for the production of oxygen by means of an integrated ion transport membrane/gas turbine system.

SUMMARY OF THE INVENTION

The invention is a process for recovering oxygen from an oxygen-containing gas mixture by compressing the oxygen-containing gas mixture, heating the resulting compressed gas mixture, and passing the resulting compressed and heated mixture into a membrane separation zone comprising one or more oxygen-selective ion transport membranes. A hot high-purity oxygen permeate stream and a hot oxygen-containing non-permeate stream are withdrawn from the membrane separation zone. The non-permeate stream is further heated and passed through an expansion turbine to generate shaft power and a turbine exhaust stream is withdrawn therefrom. The operating temperatures of the membrane separation zone and expansion turbine are independently maintained by controlling the rates of heat addition in the heating steps, whereby the membrane separation zone and the expansion turbine are thermally delinked for optimum efficiency in recovering oxygen. Turbine shaft power preferably is used for gas compression.

Heating is accomplished in one embodiment by direct-fired burners prior to the membrane separation zone and the expansion turbine respectively, and the temperatures of the membrane zone and expansion turbine are independently maintained by controlling the firing rate of each burner. Alternately, the membrane zone feed can be heated by indirect heat exchange with combustion gases from a direct-fired burner utilizing the membrane non-permeate stream. Optionally, the compressed oxygen-containing gas mixture can be preheated by indirect heat exchange with the hot gas turbine exhaust prior to final heating and flow to the membrane zone.

In another alternate embodiment, the compressed oxygen-containing gas is split into two streams for initial heating, wherein a smaller stream is heated by indirect heat exchange with hot oxygen permeate and a larger stream is heated by indirect heat exchange with effluent from a direct-fired burner operating on the non-permeate stream. The heated, split streams are combined and passed to the membrane zone for separation into an oxygen permeate and an oxygen-containing non-permeate stream.

The invention includes methods for operating an oxygen recovery process utilizing an integrated mixed conductor membrane zone and a hot gas expansion turbine with two direct-fired burners in which the membrane zone outlet temperature and the turbine inlet temperature are independently controlled by controlling the firing rates of the direct-fired burners.

By utilizing the methods of the present invention, it is possible to thermally delink the operation of the membrane zone and the hot gas expansion turbine by operating each at the optimum temperature for maximum overall efficiency of the oxygen recovery process.

DETAILED DESCRIPTION OF THE INVENTION

The present invention utilizes a solid ceramic ion transport membrane integrated with a high-temperature process in which heat is utilized effectively for the operation of both the membrane and the high-temperature process. The membrane and the high-temperature process are operated at different temperatures to maximize the performance of each. The membrane operates by a mechanism in which an oxygen partial pressure differential or a voltage differential across the membrane causes oxygen ions to migrate through the membrane from the feed side to the permeate side where the oxygen ions recombine to form oxygen gas and free electrons. An ion transport membrane of the pressure-driven type is defined herein as a mixed conductor membrane, in which the electrons simultaneously migrate through the membrane to preserve internal electrical neutrality. The term pressure-driven means that oxygen ions move through the membrane in the direction of decreasing partial pressure. An ion transport membrane of the electrically-driven type is defined herein as a solid electrolyte membrane, in which the electrons flow from the permeate side to the feed side of the membrane in an external circuit driven by a voltage differential. A mechanically perfect membrane of either type operating without gas leakage is infinitely selective for oxygen; in practical applications a high-purity oxygen product containing at least 98 vol % oxygen is achievable.

The present invention comprises several embodiments of a process to recover oxygen from an oxygen-containing gas mixture, preferably air, at high temperature utilizing a mixed conductor membrane which is heat integrated with a hot gas expansion turbine to maximize the efficiency of energy use in recovering oxygen with the alternate coproducts steam and electricity. The key feature of all embodiments of the invention as described herein is the thermal decoupling of the mixed conductor membrane and the hot gas turbine, which means that each is operated at a temperature which allows the most efficient operation of the combined system. This is achieved by controlled firing of direct-fired combustors as described in the following specification.

Figure 1:
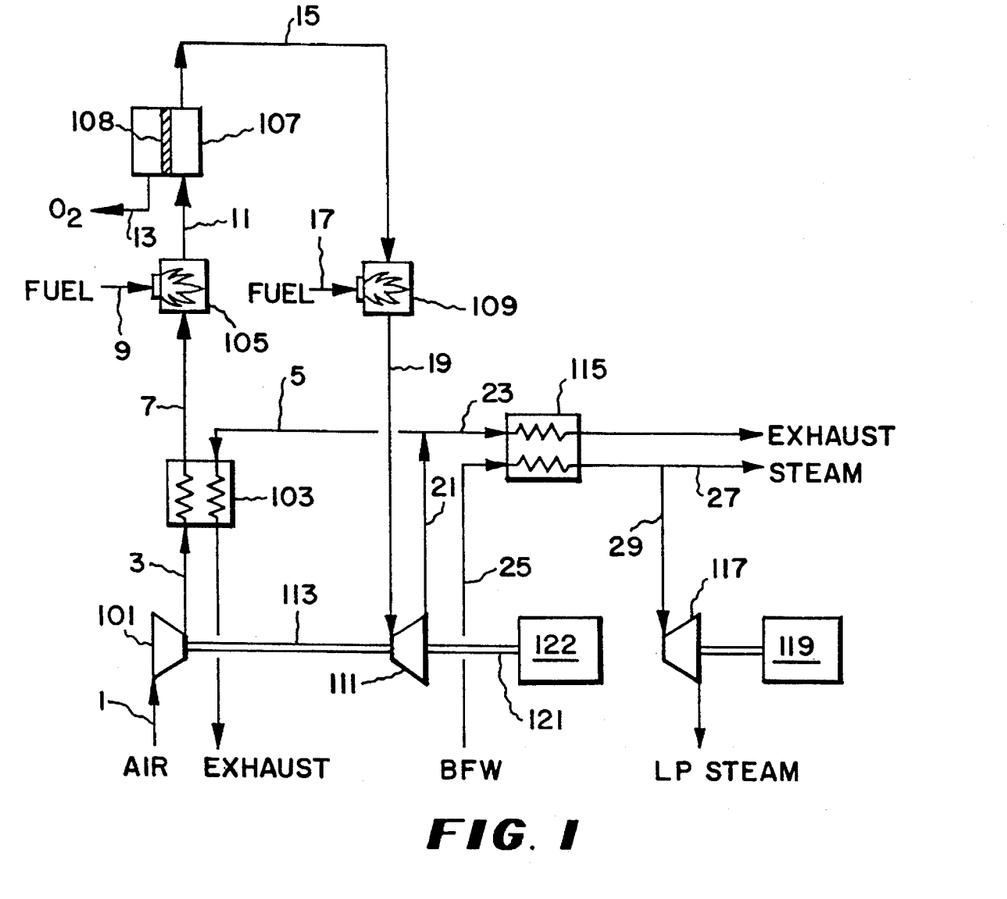
FIG. 1 is a process flow diagram of a first embodiment of the present invention.

A first embodiment of the invention is given in FIG. 1. Oxygen-containing gas 1, preferably air, is compressed in compressor 101 to a pressure between 50 and 500 psia, preferably 80 to 300 psia. Compressor 101 is a centrifugal, axial, or reciprocal compressor, optionally multistaged, and optionally intercooled. When operating without intercooling in an adiabatic mode, compressed feed 3 will be at a temperature of 360° to 1,100° F.; when operated with intercooling in an isothermal mode, compressed feed 3 will be at 150° to 300° F. Compressed feed is optionally preheated in heat exchange zone 103 by indirect heat exchange with hot process stream 5 (later defined) and heated stream 7 passes into direct-fired burner 105. This burner is a combustor, for example the type known and used in the gas turbine art, is preferably gas-fired, and utilizes fuel gas 9 which is natural gas, synthesis gas comprising hydrogen and carbon monoxide, refinery fuel gas containing mixed hydrocarbons, or another combustible gas mixture. Burner 105 is operated with sufficient excess air such that hot combustion stream 11 contains about 10–20 vol % oxygen at a temperature of 800° to 2,000° F., preferably 1,000° to 1,600° F. Stream 11 passes through the feed side of membrane separation zone 107 comprising membrane 108, preferably a mixed conductor membrane, wherein oxygen diffuses through the membrane driven by an oxygen partial pressure differential in the range of 2 to 80 psi, and high purity oxygen stream 13 containing at least 98 vol % oxygen is withdrawn therefrom at 2 to 30 psia. Hot non-permeate stream 15 is withdrawn at near feed pressure and contains 6 to 18 vol % oxygen. Membrane 108 operates in the temperature range of 800° to 2,000° F., preferably 1,000° to 1,600° F. Membrane separation zone 107 typically is sized and operated such that up to about 904 of the oxygen in membrane feed 11 is recovered as product 13.

Alternatively, ion transport membrane 108 can be of the solid electrolyte type as described earlier which is driven by a voltage differential across the membrane in which electrons are conducted through an external circuit with porous electrodes attached to the surfaces of the membrane. In this mode of operation the oxygen permeate product may be recovered at or above the feed pressure.

Ion transport membrane 108 is typically a solid ceramic assembly in the form of tubes, sheets, or a monolithic honeycomb. The membrane divides membrane separation zone 107 into a feed side having a higher oxygen partial pressure and a permeate side having a lower oxygen partial pressure. Typical compositions of the active membrane material are given in representative articles by Y. Teraoka et al in Chemistry Letters, 1985, pp. 1743–1746 and by H. Iwahara et al in Advances in Ceramics, Vol. 24: Science and Technology of Zirconia III, pp. 907–914, or in the article by J. D. Wright and R. J. Copeland earlier cited.

Any solid ceramic membrane material which selectively permeates oxygen in the form of oxygen ions, of either the mixed conductor or solid electrolyte type described above, can be utilized in the present invention. Preferred membranes of the mixed conductor type are described in U.S. Pat. No. 5,240,480, which is incorporated herein by reference. This patent discloses a membrane which comprises a porous layer with an average pore radius of less than 10 microns upon which is deposited a nonporous dense layer, in which both the porous substrate and the nonporous dense layer comprise multicomponent metallic oxides capable of conducting electrons and oxygen ions. This composite membrane operates at temperatures above 500° C. and recovers high purity oxygen by the mechanism discussed earlier. Representative membranes are described in which the porous layer and/or the dense layer are formed from a multicomponent metallic oxide selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$, and $La_{0.2}Ba_{0.8}Co_{0.6}Cu_{0.2}Fe_{0.2}O_{3-x}$ where x is between 0 and 1.

Preferred membranes of the solid electrolyte type can be fabricated by depositing a thin layer of multicomponent oxide on a porous substrate as described in U.S. Pat. No. 5,160,618, which is incorporated herein by reference. A preferred membrane comprises yttria-stabilized zirconia which has been deposited into the micropores of a lanthanum-doped alumina surface layer of a porous alumina substrate having an average pore diameter of less than about 50 nanometers and on the surface layer of the alumina substrate wherein the thickness of the yttria-stabilized zirconia is 0.5 microns or less. The yttria-stabilized zirconia layer is deposited at a temperature of 700°–1100° C. at a pressure of 1 to 760 torr over a time period ranging from 1 to 120 minutes by the following method. At least two metal halides, for example yttrium chloride and zirconium chloride, are vaporized on one side of the substrate described above and an oxidizing gas such as a mixture of oxygen and water is contacted with the other side of the substrate. The two gas mixtures diffuse and react within the pores of the porous surface layer to deposit the corresponding metal oxides therein, forming the membrane capable of separating an oxygen-containing gas mixture by the mechanism described earlier. This thin coating of active membrane material can be deposited on tubes, sheets, or monolithic honeycomb before or after assembly in a membrane module.

Referring again to FIG. 1, nonpermeate stream 15, now containing 6 to 18 vol % oxygen, is combusted with fuel 17 in direct-fired burner 109 (which typically is similar to burner 105) to generate hot combustion product 19 at 800° to 3,000° F. at a pressure between 50 and 500 psia. Hot combustion product 19 is passed through hot gas expansion turbine 111 to generate shaft power, and exhaust 21 is withdrawn therefrom at 200° to 1,100° F. and a pressure between 15 and 40 psia. Turbine 111 is of the type well-known in the gas turbine art, such as the turbine of Model LM500 manufactured by General Electric. Optionally, turbine 111 can be mechanically linked with compressor 101 by shaft 113 whereby the required compression power is supplied by turbine 111. Optionally, a portion of the shaft power of turbine 111 via shaft 121 is used to product electricity in generator 122. Optionally, at least a portion 5 of turbine exhaust 21 is utilized as the previously-mentioned hot process stream in heat exchange zone 103 to preheat compressed feed 3. Optionally, at least a portion 23 of the turbine exhaust 21 can be utilized in heat exchange zone 115 to vaporize boiler feedwater 25 to generate steam 27 typically at 100 to 1,500 psia. Steam 27 can be exported as a major product, or optionally at least a portion 29 can be expanded in steam turbine 117 to provide shaft power directly or indirectly for compressor 101, or to drive generator 119 to produce electricity for internal use or export. Alternately and preferably, steam 27 is either totally exported or used totally in turbine 117.

The essential feature of the invention illustrated in the embodiment of FIG. 1 is the independent operation of mixed conductor membrane separation zone 107 and expansion turbine 111 at different temperatures by appropriate control of the respective firing rates of direct-fired burners 105 and 109 by controlling the flow rates of fuel gas 9 and 17 respectively. For example, a preferred membrane 108 operates at 1,650° F. while turbine 111 operates most efficiently at a typical inlet temperature of 2,000° F. and the process of the present invention enables independent control of these temperatures by the two direct-fired burners 105 and 109. This was not possible using prior art processes earlier described. The control of these temperatures can be described in control method terminology as follows:

(a) compress oxygen-containing gas mixture 1;

(b) heat the resulting compressed gas mixture 7 of step (a) by combusting the mixture with fuel 9 in direct-fired burner 105;

(c) pass the resulting compressed and heated stream 11 of step (b) into membrane separation zone 107 comprising one or more oxygen-selective mixed conductor membranes 108, and withdraw therefrom hot high-purity oxygen permeate stream 13 and hot oxygen-containing non-permeate stream 15;

(d) measure the temperature of hot oxygen-containing non-permeate stream 15, compare the measured temperature with a first set point temperature, and utilize the difference between the measured temperature and the first set point temperature to correct the firing rate of direct-fired burner 105, thereby maintaining the temperature of the membrane separation zone at the first set point temperature;

(e) further heat non-permeate stream 15 by combusting the stream with fuel 17 in direct-fired burner 109;

(f) pass the further heated non-permeate stream 19 of step (e) through expansion turbine 111 to generate shaft power and withdraw therefrom turbine exhaust stream 21; and (g) measure the temperature of further heated non-permeate stream 19 prior to expansion turbine 111, compare the measured temperature with a second set point temperature, and utilize the difference between the measured temperature and the second set point temperature to correct the firing rate of direct-fired burner 109, thereby maintaining the inlet temperature of the expansion turbine at the second set point temperature.

The operating temperatures of membrane separation zone 107 and expansion turbine 111 are independently maintained, and therefore membrane separation zone 107 and expansion turbine 111 are thermally delinked for optimum efficiency in recovering oxygen 13 and optionally producing steam 27 or electric power by generator 119.

Figure 2:
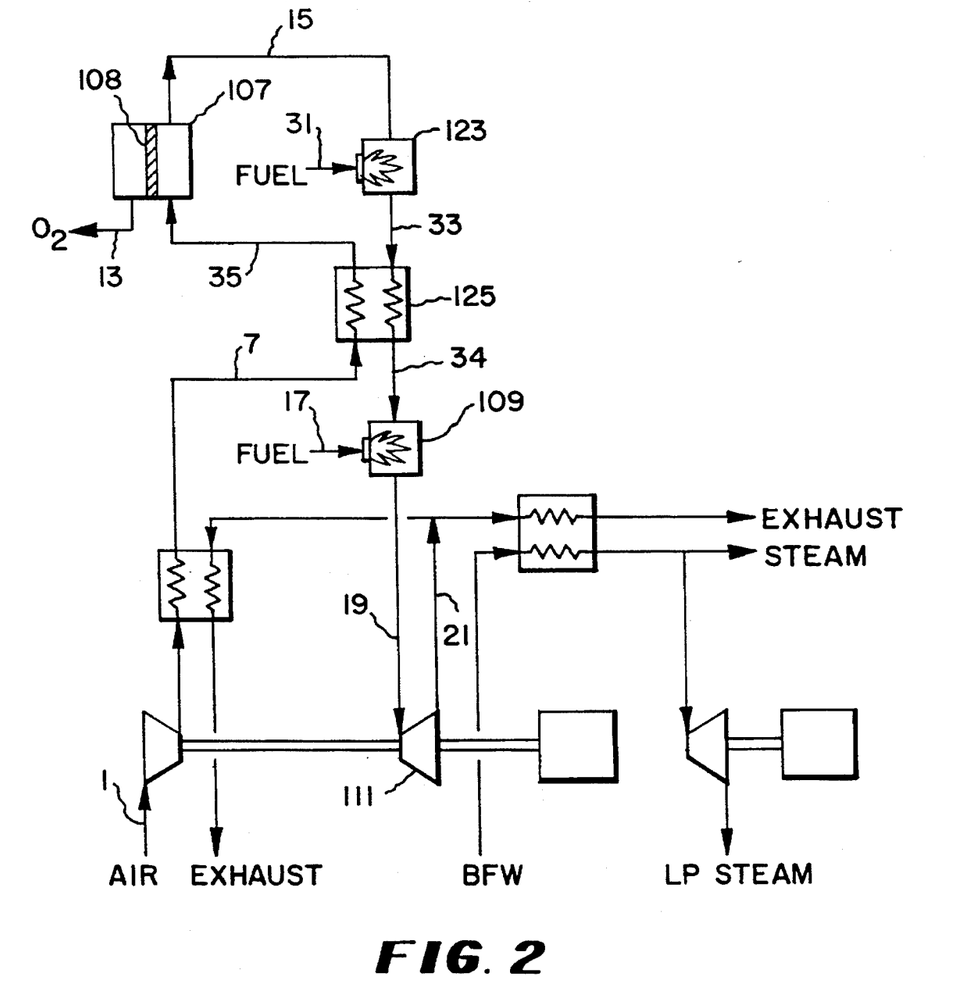
FIG. 2 is a process flow diagram of a second embodiment of the present invention.

An alternate embodiment of the invention is illustrated in FIG. 2, which is identical to the embodiment of FIG. 1 except that burner 105 is eliminated and replaced by direct-fired burner 123 which combusts fuel 31 with oxygen-containing non-permeate stream 15, and also that compressed gas mixture 7 is heated indirectly in heat exchange zone 125 against effluent 33 from burner 123. Indirectly heated compressed gas 35, which is preferably air as earlier stated, passes into membrane separation zone 107. This differs from the previous embodiment in that membrane separation zone 107 receives air feed while in the previous embodiment the membrane receives combustion product from burner 105. Thus in the embodiment of FIG. 2 the membrane receives a feed containing 21 vol % oxygen while in FIG. 1 the membrane feed following combustion contains less oxygen, thereby requiring more membrane surface area for the equivalent oxygen recovery at equivalent temperatures and total pressures. However, the embodiment of FIG. 1 does not require heat exchange zone 125 in the embodiment of FIG. 2 and thus FIG. 1 is a simpler system which would have a lower capital cost.

The essential feature of the invention illustrated in the embodiment of FIG. 2, as described above for FIG. 1, is the independent operation of mixed conductor membrane separation zone 107 and expansion turbine 111 at different temperatures by appropriate control of the respective firing rates of direct-fired burners 123 and 109 by controlling the flow rates of fuel gas 31 and 17 respectively. The control of these temperatures can be described in control method terminology as follows:

(a) compress oxygen-containing gas mixture 1;

(b) heat the resulting compressed gas mixture of step (a) by indirect heat exchange in heat exchange zone 125 with hot combustion gas stream 33, yielding a cooled combustion gas stream 34;

(c) pass the resulting compressed and heated stream 35 of step (b) into membrane separation zone 107 comprising one or more oxygen-selective mixed conductor membranes 108, and withdrawing therefrom hot high-purity oxygen permeate stream 13 and hot oxygen-containing non-permeate stream 15;

(d) combust hot oxygen-containing non-permeate stream 15 with fuel 31 in direct-fired burner 123 to yield hot combustion gas stream 33;

(e) measure the temperature of hot oxygen-containing non-permeate stream 15, compare the measured temperature with a first set point temperature, and utilize the difference between the measured temperature and the first set point temperature to correct the firing rate of direct-fired burner 123, thereby maintaining the outlet temperature of membrane separation zone 107 at the first set point temperature;

(e) heat the cooled combustion gas stream 34 by combusting the stream with fuel 17 in direct-fired burner 109 to yield high temperature combustion product 19;

(f) pass high temperature combustion product 19 through expansion turbine 111 to generate shaft power and withdraw therefrom turbine exhaust stream 21; and (g) measure the temperature of high temperature combustion product 19 prior to expansion turbine 111, compare the measured temperature with a second set point temperature, and utilize the difference between the measured temperature and the second set point temperature to correct the firing rate of direct-fired burner 109, thereby maintaining the inlet temperature of expansion turbine 111 at the second set point temperature.

The operating temperatures of membrane separation zone 107 and expansion turbine 111 are independently maintained, and therefore membrane separation zone 107 and expansion turbine 111 are thermally delinked for optimum efficiency in recovering oxygen 13 and optionally producing steam 27 or electric power by generator 119.

Figure 3:
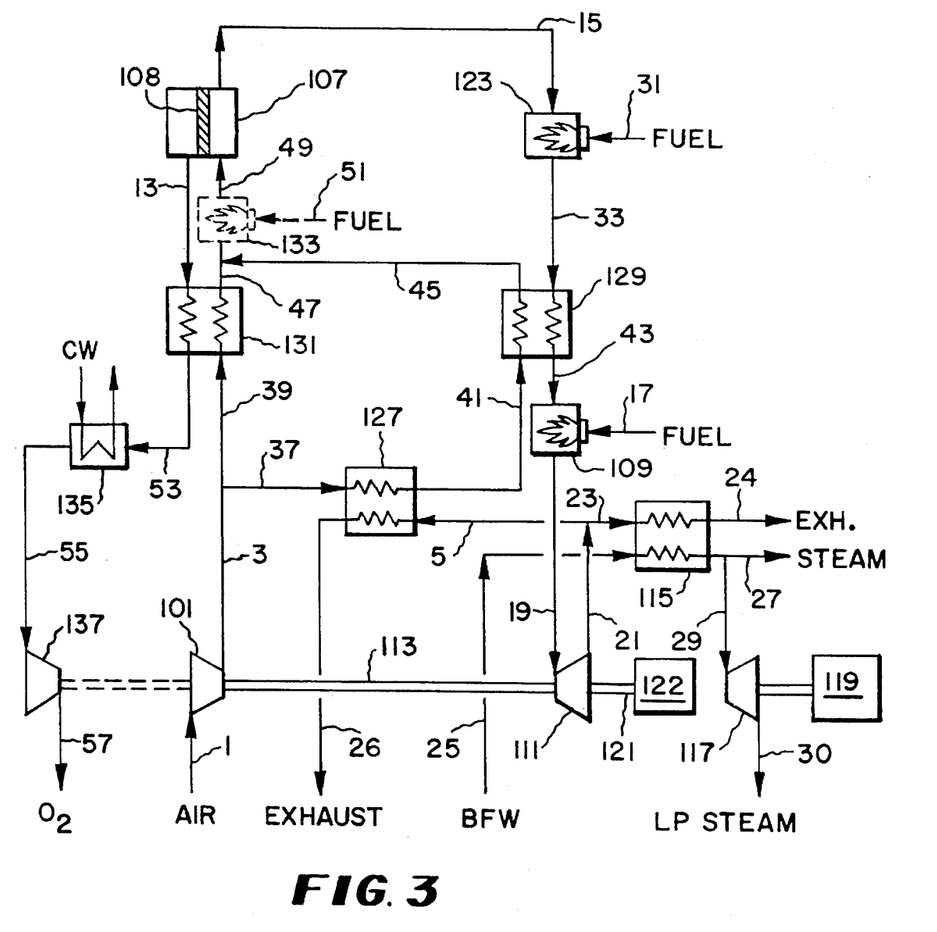
FIG. 3 is a process flow diagram of a third embodiment of the present invention.

An alternate embodiment of the invention is illustrated in FIG. 3. Oxygen-containing gas 1, preferably air, is compressed in compressor 101 to a pressure between 50 and 500 psia, preferably 80 to 300 psia as described in the previous embodiments. Compressed stream 3 is split into streams 37 and 39. Stream 37 is optionally preheated by indirect heat exchange with expansion turbine exhaust 5 in heat exchange zone 127, and stream 41 is heated to 800° to 2,000° F. by indirect heat exchange with hot combustion gas stream 33 in heat exchange zone 129, yielding cooled stream 43 which contains 5 to 20 vol % oxygen and heated split feed 45. Split feed stream 39 optionally is preheated by indirect heat exchange with hot high purity oxygen permeate stream 13 in heat exchange zone 131 and the resulting heated stream 47 is combined with heated split stream 45. Combined stream 49 flows through the feed side of mixed conductor membrane separation zone 107 comprising mixed conductor membrane 108, wherein oxygen diffuses through the membrane driven by an oxygen partial pressure differential in the range of 2 to 80 psi, and high purity oxygen stream 13 containing at least 98 vol % oxygen is withdrawn therefrom at 2 to 30 psia. Non-permeate stream 15 is withdrawn at near feed pressure and contains 6 to 20 vol % oxygen. Membrane 108 operates in the temperature range of 800° to 2,000° F., preferably 1,000° to 1,600° F. Mixed conductor membrane 108 has been described earlier with reference to FIG. 1.

Optionally, oxygen product stream 53 is further cooled in cooler 135, and cooled stream 55 is drawn through vacuum blower 137 at a pressure of 2 to 30 psia to yield product 57. This is a preferred operating mode because the oxygen partial pressure driving force across membrane 108 is increased significantly, which reduces the necessary membrane area for a given oxygen production rate.

Oxygen-containing non-permeate stream 15 is combusted with fuel 31 in direct-fired burner 123, and hot combustion gas stream 33 is cooled against split feed 41 in heat exchange zone 129, yielding cooled stream 43 earlier described. Stream 43 which contains 5 to 21 vol % oxygen is combusted with fuel 17 in direct-fired burner 109 (which is similar to burner 105 of FIG. 1) to generate hot combustion product 19 at 800° to 3,000° F. at a pressure between 50 and 500 psia. Hot combustion product 19 is passed through hot gas expansion turbine 111 to generate shaft power, and exhaust 21 is withdrawn therefrom at 200° to 1,100° F. and a pressure between 15 and 40 psia. Turbine 111 is of the type well-known in the gas turbine art as earlier described. Optionally, turbine 111 can be mechanically linked with compressor 101 by shaft 113 whereby the required compression power is supplied by turbine 111. Optionally, at least a portion 5 of turbine exhaust 21 is utilized as previously mentioned in heat exchange zone 127 to preheat split compressed feed 37. Optionally, at least a portion 23 of the turbine exhaust 21 can be utilized in heat exchange zone 115 to vaporize boiler feed water 25 to generate steam 27 typically at 100 to 1,500 psia. Steam 27 can be exported as a major product, or optionally at least a portion 29 can be expanded in steam turbine 117 to provide shaft power directly or indirectly for compressor 101, or to drive generator 119 to produce electricity for internal use or export. Alternately and preferably, steam 27 is either totally exported or used totally in turbine 117.

In an optional mode, feed 49 to membrane separation zone 107 can be heated by combustion with fuel 51 in direct-fired burner 133, in which case burner 123 and heat exchange zone 129 are not required. This arrangement is similar to the embodiment of FIG. 1 which utilizes two burners 105 and 109, which are equivalent respectively to burners 133 and 109 of FIG. 3.

The split of compressed feed stream 3 into two streams 37 and 39 is controlled so that the flow rate of stream 39 closely matches the flow rate of stream 13, thereby simplifying the design of heat exchange zone 47 and utilizing the surface area of the exchanger most efficiently. Similarly, the flow rates of streams 33 and 41 will be matched, thereby simplifying the design of heat exchange zone 129 and utilizing the surface area of the exchanger most efficiently.

The essential feature of the invention illustrated in the embodiment of FIG. 3, as described above for FIGS. 1 and 2, is the independent operation of mixed conductor membrane separation zone 107 and expansion turbine 111 at different temperatures by appropriate control of the firing rates of direct-fired burners 123 and 109 by regulating the flow rates of fuel gas 31 and 17 respectively. Alternatively in the optional mode discussed above the respective firing rates of direct-fired burners 133 and 109 are controlled by regulating the flow rates of fuel gas 51 and 17 respectively.

As described earlier, the operating temperatures of membrane separation zone 107 and expansion turbine 111 are independently maintained, and therefore membrane separation zone 107 and expansion turbine 111 are thermally delinked for optimum efficiency in recovering oxygen 13 and optionally producing steam 27 or electric power by generator 119. Preferably, expansion turbine 111 is operated at its maximum allowable inlet temperature and pressure.

The invention in each of the three embodiments described above can be operated to produce oxygen as the sole product if no market exists for steam and/or electric power at a given location. In such a case, gas turbine exhaust 21 preferably is used to preheat compressed membrane feed 3 in heat exchange zone 103 of FIG. 1 or alternatively to preheat split feed 37 in heat exchange zone 127 of FIG. 3. If markets exist at a given location for steam and/or electric power as additional products, the preferred option is to produce oxygen and one or both of these additional products. In this case, gas turbine exhaust 21 is used to raise steam in heat exchange zone 115 which is either exported or used partially or totally to drive steam turbine 117 and generator 119.

The preferred operating mode is the production of oxygen with steam and/or electric power as coproducts. This is so because this mode minimizes the equipment requirements needed for oxygen production and provides the potential for effective energy integration with the steam and power systems of the oxygen user.

Heat exchange zone 115 as shown schematically in FIGS. 1–3 is essentially a steam boiler which recovers heat from hot gases by vaporizing boiler feed water as is known in the art. High temperature gas-gas heat exchange zones 103, 125, 129, and 131 as shown schematically in FIGS. 1–3 can utilize any type of heat exchanger appropriate for this service. Such heat exchangers are manufactured for example by Hague International and Heatric, Ltd.

EXAMPLES

Heat and material balance calculations were carried out for several process embodiments of FIG. 3 using computer simulations of the process components including burners, mixed conductor membrane, compressor, vacuum blower, combustion gas turbine, steam turbine, and heat exchangers. The process basis was set for a membrane operating temperature of 850° C. and an overall oxygen recovery of 80% of the maximum recoverable oxygen for a given oxygen partial pressure. Natural gas is the fuel for the direct-fired heaters. The stage efficiencies for the compressor, combustion turbine, and steam turbine are 78%, 87%, and 80% of isentropic efficiencies respectively. Steam turbine discharge pressure is 1.2 psig and the maximum allowable condensate in the steam turbine is 12%. Boiler feed water and stack gas temperatures are 32° C. and 107° C. respectively. Total pressure drops are 15 psi in the feed/nonpermeate circuit and 1.9 psi (100 torr) in the permeate/product circuit. The temperature difference between the hot and cold streams in the gas-gas heat exchangers is 14° C. and the compressor outlet temperature is 204° C.

EXAMPLE 1

A heat and material balance was carried out for an optional operating mode of FIG. 3 in which gas turbine exhaust 21 is used entirely in heat exchange zone 115 to generate steam 27 at 614.7 psia for export. Air compressor 101 is driven by hot gas turbine 111. Steam turbine 117, generator 119, and preheat heat exchange zone 127 are not utilized. Oxygen product 53 is taken directly at atmospheric pressure, and cooler 135 and vacuum blower 137 are not utilized. The process is operated to produce a unit oxygen product of 1.0 ton/day from a unit air feed of 8.9 ton/day at an actual oxygen recovery of 48.24. Actual plant size could range from 10 to 2,000 tons/day. Key operating parameters include membrane separation zone inlet temperature of 850° C. and pressure of 174.7 psia. A stream summary for the heat and material balance is given in Table 1.

atmospheric pressure, and cooler 135 and vacuum blower 137 are not utilized. The process is operated to produce a unit oxygen product of 1.0 ton/day from a unit air feed of 8.3 ton/day at an oxygen recovery of 51.8%. Key operating parameters include membrane separation zone inlet temperature of 850° C. and pressure of 194.7 psia. A stream summary for the heat and material balance is given in Table 2.

TABLE 1

Stream Data Summary for Example 1
Steam Export

| Stream | T, °C. | P, psia | Mole Fraction | | | | Flow, lb mol/hr | | | | |
|---|---|---|---|---|---|---|---|---|---|---|---|
| | | | $N_2$ | $O_2$ | $CO_2$ | $H_2O$ | $N_2$ | $O_2$ | $CO_2$ | $H_2O$ | Total |
| 1 | 25 | 14.5 | 0.790 | 0.210 | 0.000 | 0.000 | 20.27 | 5.39 | 0.00 | 0.00 | 25.66 |
| 3 | 204 | 178.7 | 0.790 | 0.210 | 0.000 | 0.000 | 20.27 | 5.39 | 0.00 | 0.00 | 25.66 |
| 15 | 850 | 174.7 | 0.879 | 0.121 | 0.000 | 0.000 | 20.27 | 2.78 | 0.00 | 0.00 | 23.05 |
| 19 | 849 | 165.7 | 0.859 | 0.071 | 0.023 | 0.047 | 20.27 | 1.68 | 0.55 | 1.10 | 23.61 |
| 21 | 437 | 16.7 | 0.859 | 0.071 | 0.023 | 0.047 | 20.27 | 1.68 | 0.55 | 1.10 | 23.61 |
| 23 | 437 | 16.7 | 0.859 | 0.071 | 0.023 | 0.047 | 20.27 | 1.68 | 0.55 | 1.10 | 23.61 |
| 24 | 107 | 14.7 | 0.859 | 0.071 | 0.023 | 0.047 | 20.27 | 1.68 | 0.55 | 1.10 | 23.61 |
| 25 | 32 | 614.7 | 0.000 | 0.000 | 0.000 | 1.000 | 00.00 | 0.00 | 0.00 | 4.23 | 4.23 |
| 27 | 424 | 614.7 | 0.000 | 0.000 | 0.000 | 1.000 | 00.00 | 0.00 | 0.00 | 4.23 | 4.23 |
| 33 | 866 | 171.7 | 0.879 | 0.119 | 0.001 | 0.001 | 20.27 | 2.76 | 0.01 | 0.03 | 23.07 |
| 39 | 204 | 178.7 | 0.790 | 0.210 | 0.000 | 0.000 | 2.27 | 0.60 | 0.00 | 0.00 | 2.88 |
| 41 | 204 | 178.7 | 0.790 | 0.210 | 0.000 | 0.000 | 18.00 | 4.78 | 0.00 | 0.00 | 22.78 |
| 43 | 228 | 167.7 | 0.879 | 0.119 | 0.001 | 0.001 | 20.27 | 2.76 | 0.01 | 0.03 | 23.07 |
| 45 | 852 | 174.7 | 0.790 | 0.210 | 0.000 | 0.000 | 18.00 | 4.78 | 0.00 | 0.00 | 22.78 |
| 47 | 836 | 174.7 | 0.790 | 0.210 | 0.000 | 0.000 | 2.27 | 0.60 | 0.00 | 0.00 | 2.88 |
| 49 | 850 | 174.7 | 0.790 | 0.210 | 0.000 | 0.000 | 20.27 | 5.39 | 0.00 | 0.00 | 25.66 |
| 53 | 218 | 16.6 | 0.000 | 1.000 | 0.000 | 0.000 | 0.00 | 2.60 | 0.00 | 0.00 | 2.60 |

EXAMPLE 2

A heat and material balance was carried out for an alternative operating mode of FIG. 3 in which gas turbine exhaust 21 is used entirely in heat exchange zone 115 to generate steam 27 at 264.7 psia. Air compressor 101 is driven by hot gas turbine 111. Steam 29 is used to drive turbine 117 and no steam is exported. Generator 119 and preheat heat exchange zone 127 are not utilized and shaft power from turbine 117 provides part of the power for compressor 101. Oxygen product 53 is taken directly at

TABLE 2

Stream Data Summary for Example 2
Gas and Steam Turbines Driving Compressor

| Stream | T, °C. | P, psia | Mole Fraction | | | | Flow, lb mol/hr | | | | |
|---|---|---|---|---|---|---|---|---|---|---|---|
| | | | $N_2$ | $O_2$ | $CO_2$ | $H_2O$ | $N_2$ | $O_2$ | $CO_2$ | $H_2O$ | Total |
| 1 | 25 | 14.5 | 0.790 | 0.210 | 0.000 | 0.000 | 18.88 | 5.02 | 0.00 | 0.00 | 23.90 |
| 3 | 204 | 198.7 | 0.790 | 0.210 | 0.000 | 0.000 | 18.88 | 5.02 | 0.00 | 0.00 | 23.90 |
| 15 | 850 | 194.7 | 0.887 | 0.113 | 0.000 | 0.000 | 18.88 | 2.41 | 0.00 | 0.00 | 21.30 |
| 19 | 728 | 185.7 | 0.871 | 0.075 | 0.018 | 0.036 | 18.88 | 1.64 | 0.39 | 0.78 | 21.69 |
| 21 | 339 | 16.7 | 0.871 | 0.075 | 0.018 | 0.036 | 18.88 | 1.64 | 0.39 | 0.78 | 21.69 |
| 23 | 339 | 16.7 | 0.871 | 0.075 | 0.018 | 0.036 | 18.88 | 1.64 | 0.39 | 0.78 | 21.69 |
| 24 | 107 | 14.7 | 0.871 | 0.075 | 0.018 | 0.036 | 18.88 | 1.64 | 0.39 | 0.78 | 21.69 |
| 25 | 32 | 264.7 | 0.000 | 0.000 | 0.000 | 1.000 | 00.00 | 0.00 | 0.00 | 3.01 | 3.01 |
| 29 | 260 | 264.7 | 0.000 | 0.000 | 0.000 | 1.000 | 00.00 | 0.00 | 0.00 | 3.01 | 3.01 |
| 30 | 100 | 14.7 | 0.000 | 0.000 | 0.000 | 1.000 | 00.00 | 0.00 | 0.00 | 3.01 | 3.01 |
| 33 | 866 | 191.7 | 0.886 | 0.112 | 0.001 | 0.001 | 18.88 | 2.39 | 0.01 | 0.03 | 21.31 |
| 39 | 204 | 198.7 | 0.790 | 0.210 | 0.000 | 0.000 | 2.27 | 0.60 | 0.00 | 0.00 | 2.88 |
| 41 | 204 | 198.7 | 0.790 | 0.210 | 0.000 | 0.000 | 16.61 | 4.41 | 0.00 | 0.00 | 21.02 |
| 43 | 228 | 187.7 | 0.886 | 0.112 | 0.001 | 0.001 | 18.88 | 2.39 | 0.01 | 0.03 | 21.31 |
| 45 | 852 | 194.7 | 0.790 | 0.210 | 0.000 | 0.000 | 16.61 | 4.41 | 0.00 | 0.00 | 21.02 |
| 47 | 836 | 194.7 | 0.790 | 0.210 | 0.000 | 0.000 | 2.27 | 0.60 | 0.00 | 0.00 | 2.88 |
| 49 | 850 | 194.7 | 0.790 | 0.210 | 0.000 | 0.000 | 18.88 | 5.02 | 0.00 | 0.00 | 23.90 |
| 53 | 218 | 16.6 | 0.000 | 1.000 | 0.000 | 0.000 | 00.00 | 2.60 | 0.00 | 0.00 | 2.60 |

EXAMPLE 3

A heat and material balance was carried out for another alternative operating mode of FIG. 3 in which gas turbine exhaust 21 is used entirely to preheat split air feed 37 in heat exchange zone 127. Air compressor 101 is driven by hot gas turbine 111. No steam is generated, and heat exchange zone 115 and turbine 117 are not utilized. Generator 119 is not utilized. Oxygen product 53 is taken directly at atmospheric pressure, and cooler 135 and vacuum blower 137 are not utilized. The process is operated to produce a unit oxygen product of 1.0 ton/day from a unit air feed of 7.9 ton/day at an actual oxygen recovery of 54.6%. Key operating parameters include a membrane separation zone inlet temperature of 850° C. and a membrane feed pressure of 214.7 psia. A stream summary for the heat and material balance is given in Table 3.

Figure 5:
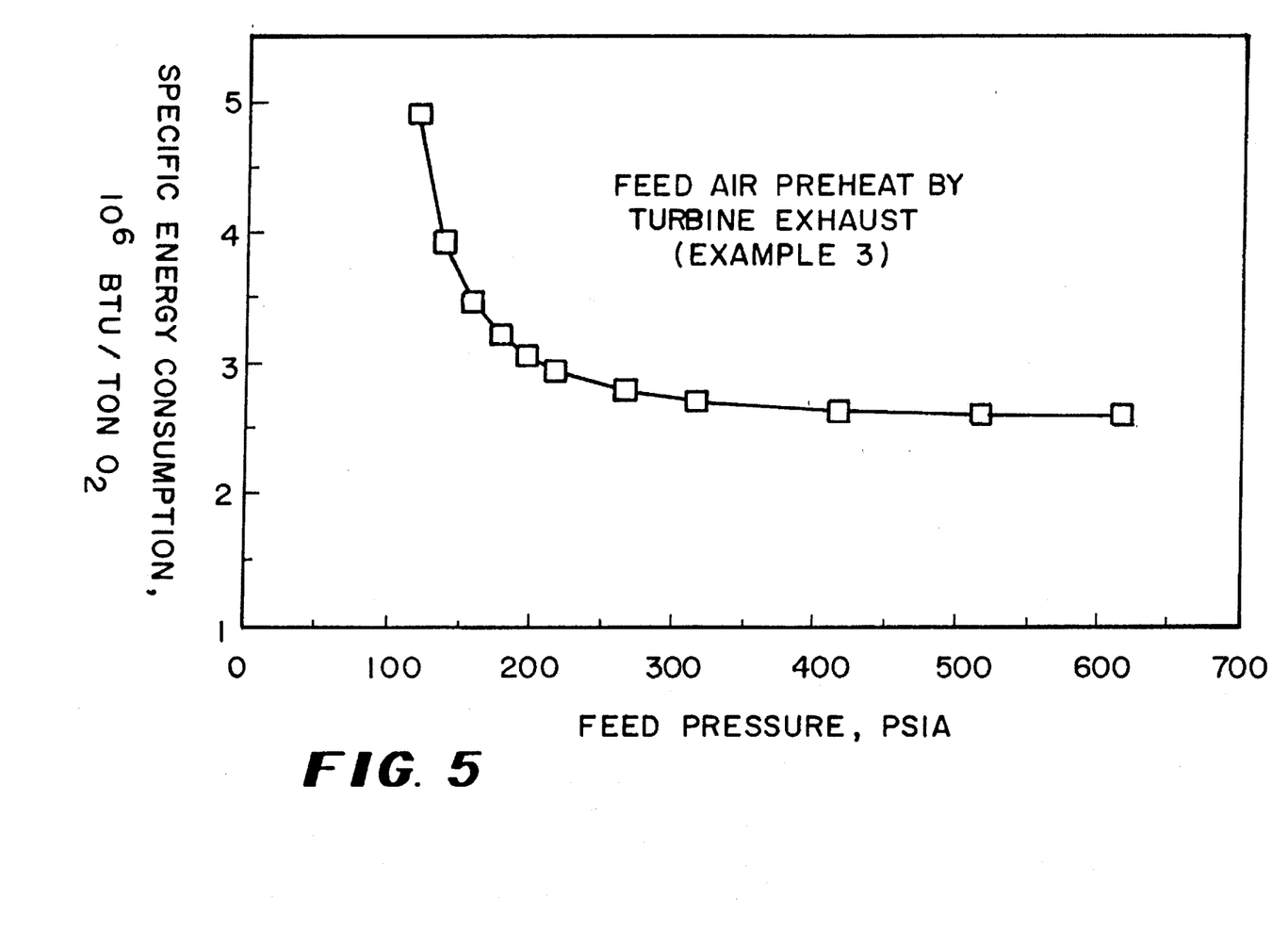
FIG. 5 is a plot of specific energy consumed in MMBTU fired per ton of oxygen vs. membrane feed pressure for an alternate process configuration of the present invention.

The heat and material balance was repeated at a series of feed pressures to determine the effect of pressure on the specific energy consumption, and the results are presented in FIG. 5. It is seen that increasing the feed pressure from 100 psia significantly decreases the specific energy consumption, and that the benefit of increasing the feed pressure becomes negligible above about 450 psia.

101 and vacuum blower 137 are driven by hot gas turbine 111. Steam turbine 117, generator 119, and preheat heat exchange zone 127 are not utilized. Oxygen 53 is cooled in cooler 135 and withdrawn at a subatmospheric pressure of 5.8 psia by vacuum blower 137 to yield oxygen product 57 at atmospheric pressure. The process is operated to produce a unit oxygen product of 1.0 ton/day from a unit air feed of 9.5 ton/day at an actual oxygen recovery of 45.2%. Key operating parameters include membrane separation zone inlet temperature of 850° C. and pressure of 74.7 psia and a permeate pressure of 7.7 psia. A stream summary for the heat and material balance is given in Table 4.

TABLE 3

Stream Data Summary for Example 3
Air Feed Preheat by Turbine Exhaust

| | | | Mole Fraction | | | | Flow, lb mol/hr | | | | |
|---|---|---|---|---|---|---|---|---|---|---|---|
| Stream | T, °C. | P, psia | $N_2$ | $O_2$ | $CO_2$ | $H_2O$ | $N_2$ | $O_2$ | $CO_2$ | $H_2O$ | Total |
| 1 | 25 | 14.5 | 0.790 | 0.210 | 0.000 | 0.000 | 17.90 | 4.76 | 0.0000 | 0.0000 | 22.66 |
| 3 | 89 | 218.7 | 0.790 | 0.210 | 0.000 | 0.000 | 17.90 | 4.76 | 0.0000 | 0.0000 | 22.66 |
| 5 | 374 | 16.7 | 0.877 | 0.069 | 0.018 | 0.036 | 17.90 | 1.41 | 0.3700 | 0.7400 | 20.42 |
| 15 | 850 | 214.7 | 0.893 | 0.107 | 0.000 | 0.000 | 17.90 | 2.15 | 0.0000 | 0.0000 | 20.06 |
| 19 | 825 | 207.7 | 0.877 | 0.069 | 0.018 | 0.036 | 17.90 | 1.41 | 0.3700 | 0.7400 | 20.42 |
| 21 | 374 | 16.7 | 0.877 | 0.069 | 0.018 | 0.036 | 17.90 | 1.41 | 0.3700 | 0.7400 | 20.42 |
| 26 | 107 | 14.7 | 0.877 | 0.069 | 0.018 | 0.036 | 17.90 | 1.41 | 0.3700 | 0.7400 | 20.42 |
| 33 | 1265 | 211.7 | 0.877 | 0.069 | 0.018 | 0.036 | 17.90 | 1.41 | 0.3700 | 0.7400 | 20.42 |
| 37 | 89 | 218.7 | 0.790 | 0.210 | 0.000 | 0.000 | 15.62 | 4.15 | 0.0000 | 0.0000 | 19.78 |
| 39 | 89 | 218.7 | 0.790 | 0.210 | 0.000 | 0.000 | 2.28 | 0.61 | 0.0000 | 0.0000 | 2.88 |
| 41 | 367 | 216.7 | 0.790 | 0.210 | 0.000 | 0.000 | 15.62 | 4.15 | 0.0000 | 0.0000 | 19.78 |
| 43 | 825 | 207.7 | 0.877 | 0.069 | 0.018 | 0.036 | 17.90 | 1.41 | 0.3700 | 0.7400 | 20.42 |
| 45 | 852 | 216.7 | 0.790 | 0.210 | 0.000 | 0.000 | 15.62 | 4.15 | 0.0000 | 0.0000 | 19.78 |
| 47 | 836 | 214.7 | 0.790 | 0.210 | 0.000 | 0.000 | 2.28 | 0.61 | 0.0000 | 0.0000 | 2.88 |
| 49 | 850 | 214.7 | 0.790 | 0.210 | 0.000 | 0.000 | 17.90 | 4.76 | 0.0000 | 0.0000 | 22.66 |
| 53 | 103 | 16.6 | 0.000 | 1.000 | 0.000 | 0.000 | 0.00 | 2.60 | 0.0000 | 0.0000 | 2.60 |

EXAMPLE 4

A heat and material balance was carried out for another alternative operating mode of FIG. 3 in which gas turbine exhaust 21 is used entirely in heat exchange zone 115 to generate steam 27 at 1275 psia for export. Air compressor

TABLE 4

Stream Data Summary for Example 4
Steam Export with Pemeate Vacuum Blower

| | | | Mole Fraction | | | | Flow, lb mol/hr | | | | |
|---|---|---|---|---|---|---|---|---|---|---|---|
| Stream | T, °C. | P, psia | $N_2$ | $O_2$ | $CO_2$ | $H_2O$ | $N_2$ | $O_2$ | $CO_2$ | $H_2O$ | Total |
| 1 | 25 | 14.5 | 0.790 | 0.210 | 0.000 | 0.000 | 21.66 | 5.76 | 0.00 | 0.00 | 27.42 |
| 3 | 204 | 78.7 | 0.790 | 0.210 | 0.000 | 0.000 | 21.66 | 5.76 | 0.00 | 0.00 | 27.42 |
| 13 | 850 | 7.7 | 0.000 | 1.000 | 0.000 | 0.000 | 0.00 | 2.60 | 0.00 | 0.00 | 2.60 |
| 15 | 850 | 74.7 | 0.873 | 0.127 | 0.000 | 0.000 | 21.66 | 3.15 | 0.00 | 0.00 | 24.81 |
| 19 | 802 | 65.7 | 0.855 | 0.083 | 0.021 | 0.041 | 21.66 | 2.11 | 0.52 | 1.05 | 25.34 |
| 21 | 537 | 16.7 | 0.855 | 0.083 | 0.021 | 0.041 | 21.66 | 2.11 | 0.52 | 1.05 | 25.34 |
| 23 | 537 | 16.7 | 0.855 | 0.083 | 0.021 | 0.041 | 21.66 | 2.11 | 0.52 | 1.05 | 25.34 |
| 24 | 107 | 14.7 | 0.855 | 0.083 | 0.021 | 0.041 | 21.66 | 2.11 | 0.52 | 1.05 | 25.34 |
| 25 | 32 | 1275.0 | 0.000 | 0.000 | 0.000 | 1.000 | 00.00 | 0.00 | 0.00 | 6.10 | 6.10 |
| 27 | 523 | 1275.0 | 0.000 | 0.000 | 0.000 | 1.000 | 00.00 | 0.00 | 0.00 | 6.10 | 6.10 |
| 33 | 866 | 71.7 | 0.872 | 0.126 | 0.001 | 0.001 | 21.66 | 3.12 | 0.02 | 0.03 | 24.83 |
| 39 | 204 | 78.7 | 0.790 | 0.210 | 0.000 | 0.000 | 2.27 | 0.60 | 0.00 | 0.00 | 2.88 |

TABLE 4-continued

Stream Data Summary for Example 4
Steam Export with Permeate Vacuum Blower

| | | | Mole Fraction | | | | Flow, lb mol/hr | | | | |
|---|---|---|---|---|---|---|---|---|---|---|---|
| Stream | T, °C. | P, psia | $N_2$ | $O_2$ | $CO_2$ | $H_2O$ | $N_2$ | $O_2$ | $CO_2$ | $H_2O$ | Total |
| 41 | 204 | 78.7 | 0.790 | 0.210 | 0.000 | 0.000 | 19.39 | 5.15 | 0.00 | 0.00 | 24.54 |
| 43 | 227 | 67.7 | 0.872 | 0.126 | 0.001 | 0.001 | 21.66 | 3.12 | 0.02 | 0.03 | 24.83 |
| 45 | 852 | 74.7 | 0.790 | 0.210 | 0.000 | 0.000 | 19.39 | 5.15 | 0.00 | 0.00 | 24.54 |
| 47 | 836 | 74.7 | 0.790 | 0.210 | 0.000 | 0.000 | 2.27 | 0.60 | 0.00 | 0.00 | 2.88 |
| 49 | 850 | 74.7 | 0.790 | 0.210 | 0.000 | 0.000 | 21.66 | 5.76 | 0.00 | 0.00 | 27.42 |
| 53 | 218 | 5.8 | 0.000 | 1.000 | 0.000 | 0.000 | 0.00 | 2.60 | 0.00 | 0.00 | 2.60 |
| 55 | 218 | 5.8 | 0.000 | 1.000 | 0.000 | 0.000 | 0.00 | 2.60 | 0.00 | 0.00 | 2.60 |
| 57 | 252 | 14.7 | 0.000 | 1.000 | 0.000 | 0.000 | 0.00 | 2.60 | 0.00 | 0.00 | 2.60 |

EXAMPLE 5

A heat and material balance was carried out for another alternative operating mode of FIG. 3 in which gas turbine exhaust 21 is used entirely to preheat split air feed 37 in heat exchange zone 127. Air compressor 101 and vacuum blower 137 are driven by hot gas turbine 111. No steam is generated, and heat exchange zone 115 and turbine 117 are not utilized. Generator 119 is not utilized. Oxygen 53 is cooled in cooler 135 and is withdrawn at a subatmospheric pressure of 5.8 psia by vacuum blower 137 to yield oxygen product 57 at atmospheric pressure. The process is operated to produce a unit oxygen product of 1.0 ton/day from a unit air feed of 8.1 ton/day at an actual oxygen recovery of 53.2%. Key operating parameters include membrane separation zone inlet temperature of 850° C. and pressure of 94.7 psia. A stream summary for the heat and material balance is given in Table 5.

TABLE 5

Stream Data Summary for Example 5
Air Feed Preheat Plus Permeate Vacuum Blower

| | | | Mole Fraction | | | | Flow, lb mol/hr | | | | |
|---|---|---|---|---|---|---|---|---|---|---|---|
| Stream | T, °C. | P, psia | $N_2$ | $O_2$ | $CO_2$ | $H_2O$ | $N_2$ | $O_2$ | $CO_2$ | $H_2O$ | Total |
| 1 | 25 | 14.5 | 0.790 | 0.210 | 0.000 | 0.000 | 18.41 | 4.89 | 0.00 | 0.00 | 23.30 |
| 3 | 69 | 98.7 | 0.790 | 0.210 | 0.000 | 0.000 | 18.41 | 4.89 | 0.00 | 0.00 | 23.30 |
| 5 | 492 | 16.7 | 0.879 | 0.085 | 0.012 | 0.024 | 18.41 | 1.79 | 0.25 | 0.50 | 20.95 |
| 13 | 850 | 7.7 | 0.000 | 1.000 | 0.000 | 0.000 | 00.00 | 2.60 | 0.00 | 0.00 | 2.60 |
| 15 | 850 | 94.7 | 0.889 | 0.111 | 0.000 | 0.000 | 18.41 | 2.29 | 0.00 | 0.00 | 20.69 |
| 19 | 800 | 85.7 | 0.879 | 0.085 | 0.012 | 0.024 | 18.41 | 1.79 | 0.25 | 0.50 | 20.95 |
| 21 | 492 | 16.7 | 0.879 | 0.085 | 0.012 | 0.024 | 18.41 | 1.79 | 0.25 | 0.50 | 20.95 |
| 26 | 107 | 14.7 | 0.879 | 0.085 | 0.012 | 0.024 | 18.41 | 1.79 | 0.25 | 0.50 | 20.95 |
| 33 | 866 | 91.7 | 0.889 | 0.109 | 0.001 | 0.001 | 18.41 | 2.26 | 0.01 | 0.03 | 20.71 |
| 37 | 69 | 98.7 | 0.790 | 0.210 | 0.000 | 0.000 | 16.13 | 4.29 | 0.00 | 0.00 | 20.42 |
| 39 | 69 | 98.7 | 0.790 | 0.210 | 0.000 | 0.000 | 2.28 | 0.61 | 0.00 | 0.00 | 2.88 |
| 41 | 470 | 96.7 | 0.790 | 0.210 | 0.000 | 0.000 | 16.13 | 4.29 | 0.00 | 0.00 | 20.42 |
| 43 | 490 | 87.7 | 0.889 | 0.109 | 0.001 | 0.001 | 18.41 | 2.26 | 0.01 | 0.03 | 20.71 |
| 45 | 852 | 94.7 | 0.790 | 0.210 | 0.000 | 0.000 | 16.13 | 4.29 | 0.00 | 0.00 | 20.42 |
| 47 | 836 | 94.7 | 0.790 | 0.210 | 0.000 | 0.000 | 2.28 | 0.61 | 0.00 | 0.00 | 2.88 |
| 49 | 850 | 94.7 | 0.790 | 0.210 | 0.000 | 0.000 | 18.41 | 4.89 | 0.00 | 0.00 | 23.30 |
| 53 | 83 | 5.8 | 0.000 | 1.000 | 0.000 | 0.000 | 00.00 | 2.60 | 0.00 | 0.00 | 2.60 |
| 55 | 83 | 5.8 | 0.000 | 1.000 | 0.000 | 0.000 | 00.00 | 2.60 | 0.00 | 0.00 | 2.60 |
| 57 | 107 | 14.7 | 0.000 | 1.000 | 0.000 | 0.000 | 00.00 | 2.60 | 0.00 | 0.00 | 2.60 |

EXAMPLE 6

The heat and material balances of Examples 1, 2, and 4 were repeated at various values of membrane feed pressure to determine the effect of pressure on the energy consumed per unit of oxygen produced for the different process configurations. The results are presented in FIG. 4 in which the specific energy consumed as MMBTU fired per ton of oxygen is plotted against membrane feed pressure for the three process configurations.

Figure 4:
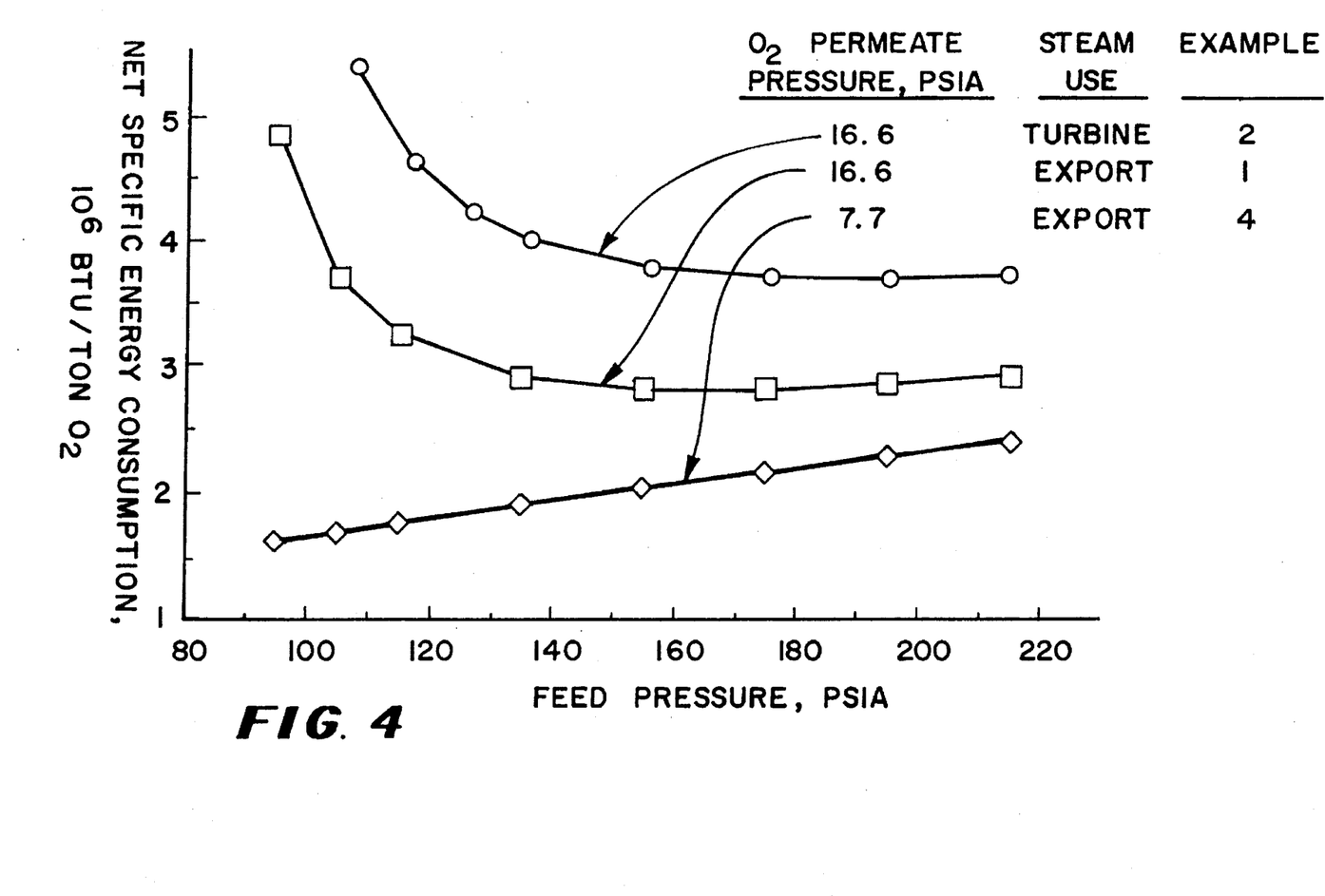
FIG. 4 is a plot of specific energy consumed in MMBTU fired per ton of oxygen vs. membrane feed pressure for three process configurations of the present invention.

It is seen from FIG. 4 that for the process configuration of Example 1, in which oxygen is produced at 16.6 psia and the turbine waste heat is used to generate export steam, the specific energy decreases as feed pressure increases and the benefit of increasing feed pressure becomes negligible above about 170 psia. For the process configuration of Example 2, oxygen is produced at 16.6 psia and the turbine waste heat is used to generate steam. The steam is used to generate turbine shaft power which supplements the gas turbine power used for feed air compression. As seen in FIG. 4 for Example 2, the specific energy decreases as feed pressure increases and the benefit of increasing feed pressure becomes negligible above about 200 psia. It is further seen that for the process configuration of Example 4, in which oxygen is produced at 7.7 psia by utilizing a vacuum blower and the turbine waste heat is used to generate steam for export, the specific energy increases slowly as feed pressure increases. The data of FIG. 4 indicate that steam export is generally preferred over using the steam to generate shaft power for feed compression, and that operating the membrane at a subatmospheric permeate pressure is a desirable option to decrease specific energy consumption.

EXAMPLE 7

Selected specific energy consumption data for the process configurations illustrated in Example 6 were compared with the equivalent energy consumption of a state-of-the-art cryogenic separation process. Most cryogenic air separation plants are electrically driven and the most efficient state-of-the-art cryogenic plants can produce gaseous oxygen at a minimum electrical energy consumption of about 250 KWH/ton. In order to compare the energy consumption of an electrically-driven cryogenic process with that of the thermally-driven present invention on a common basis, it is necessary to determine an equivalent conversion between thermal energy and electrical energy. One useful method is to compare electrical energy and direct thermal energy (as natural gas) on a cost basis. For the purpose of comparison in this Example, the price of electricity was selected as 4.0 cents/KWH and the price of natural gas was taken as $2.00/MMBTU. The specific energy cost per ton of oxygen produced at a membrane feed air pressure of 175 psia of FIG. 4 is compared with that of a state-of-the-art cryogenic process in Table 6. This comparison illustrates that the process of the present invention is more energy cost-efficient than conventional cryogenic process technology for the production of oxygen. The fundamental reason for this difference is that the present invention is driven by direct thermal energy whereas the typical cryogenic process is driven by electricity, and the use of electricity inherently includes the inefficiencies of converting thermal energy into electricity.

TABLE 6

Specific Energy Cost Comparison of Cryogenic Separation and Method of the Present Invention

| Process | $/Ton Oxygen |
|---|---|
| Cryogenic Separation typical | 10.00 |

TABLE 6-continued

Specific Energy Cost Comparison of Cryogenic Separation and Method of the Present Invention

| Process | $/Ton Oxygen |
|---|---|
| minimum specific power Present Invention: | |
| 16.6 psia product and steam export (Example 1) | 4.70 |
| 16.6 psia product and steam to steam turbine (Example 2) | 7.30 |
| 7.7 psia product and steam export (Example 4) | 1.90 |

EXAMPLE 8

A heat and material balance was performed for an optional mode of FIG. 3 in which turbine exhaust 21 is used entirely in heat exchange zone 115 to generate 0.97 ton/day of steam 27 at 264.7 psia for export. Compressor 101 is driven by hot gas turbine 111. In this mode, feed 49 to membrane separation zone 107 is heated by combustion with fuel 51 in direct-fired burner 133 and burner 123 is not utilized. Steam turbine 117, generator 119, and preheat exchange zone 127 are not utilized. Membrane separation zone 107 operates at a temperature of 1562° F. (850° C.) and a feed side pressure of 210 psia. Oxygen 13 is used to preheat feed 39 in heat exchange zone 131. Oxygen product 53 is cooled in cooler 135 and withdrawn at 6.8 psia by vacuum blower 137 to yield oxygen product 57 at 16.6 psia. The process is operated to produce 1.0 ton/day of oxygen 57 from 6.6 ton/day of air feed 3 at an oxygen recovery of 65%. A stream summary for Example 8 is given in Table 7.

TABLE 7

Stream for Example 8

| | | | Composition (mol %) | | | | | Flow Rate (lb/hr) | | | | | |
|---|---|---|---|---|---|---|---|---|---|---|---|---|---|
| Stream | Temperature (deg. F.) | Pressure (psia) | Nitrogen | Oxygen | Carbon Dioxide | Water | Methane | Nitrogen | Oxygen | Carbon Dioxide | Water | Methane | Total |
| 1 | 70 | 14.7 | 79.0 | 21.0 | 0.0 | 0.0 | 0.0 | 421.9 | 128.1 | 0.0 | 0.0 | 0.0 | 550.0 |
| 3 | 758 | 210 | 79.0 | 21.0 | 0.0 | 0.0 | 0.0 | 421.9 | 128.1 | 0.0 | 0.0 | 0.0 | 550.0 |
| 41 | 758 | 210 | 79.0 | 21.0 | 0.0 | 0.0 | 0.0 | 362.0 | 109.9 | 0.0 | 0.0 | 0.0 | 471.9 |
| 45 | 1312 | 210 | 79.0 | 21.0 | 0.0 | 0.0 | 0.0 | 362.0 | 109.9 | 0.0 | 0.0 | 0.0 | 471.9 |
| 39 | 758 | 210 | 79.0 | 21.0 | 0.0 | 0.0 | 0.0 | 59.9 | 18.2 | 0.0 | 0.0 | 0.0 | 78.1 |
| 47 | 1312 | 210 | 79.0 | 21.0 | 0.0 | 0.0 | 0.0 | 59.9 | 18.2 | 0.0 | 0.0 | 0.0 | 78.1 |
| 51 | 70 | 210 | 0.0 | 0.0 | 0.0 | 0.0 | 100.0 | 0.0 | 0.0 | 0.0 | 0.0 | 1.9 | 1.9 |
| 49 | 1562 | 210 | 78.5 | 19.6 | 0.6 | 1.2 | 0.0 | 421.9 | 120.6 | 5.2 | 4.2 | 0.0 | 551.9 |
| 13 | 1562 | 6.8 | 0.0 | 100.0 | 0.0 | 0.0 | 0.0 | 0.0 | 83.3 | 0.0 | 0.0 | 0.0 | 83.3 |
| 53 | 1029 | 6.8 | 0.0 | 100.0 | 0.0 | 0.0 | 0.0 | 0.0 | 83.3 | 0.0 | 0.0 | 0.0 | 83.3 |
| 55 | 95 | 6.8 | 0.0 | 100.0 | 0.0 | 0.0 | 0.0 | 0.0 | 83.3 | 0.0 | 0.0 | 0.0 | 83.3 |
| 57 | 320 | 16.6 | 0.0 | 100.0 | 0.0 | 0.0 | 0.0 | 0.0 | 83.3 | 0.0 | 0.0 | 0.0 | 83.3 |
| 15 | 1562 | 210 | 90.9 | 7.0 | 0.7 | 1.4 | 0.0 | 421.9 | 37.3 | 5.2 | 4.2 | 0.0 | 468.6 |
| 43 | 1029 | 210 | 90.9 | 7.0 | 0.7 | 1.4 | 0.0 | 421.9 | 37.3 | 5.2 | 4.2 | 0.0 | 468.6 |
| 17 | 70 | 210 | 0.0 | 0.0 | 0.0 | 0.0 | 100.0 | 0.0 | 0.0 | 0.0 | 0.0 | 7.0 | 7.0 |
| 19 | 2060 | 210 | 88.5 | 1.7 | 3.3 | 6.5 | 0.0 | 421.9 | 9.3 | 24.4 | 20.0 | 0.0 | 475.6 |
| 21 | 959 | 14.7 | 88.5 | 1.7 | 3.3 | 6.5 | 0.0 | 421.9 | 9.3 | 24.4 | 20.0 | 0.0 | 475.6 |
| 24 | 225 | 14.7 | 88.5 | 1.7 | 3.3 | 6.5 | 0.0 | 421.9 | 9.3 | 24.4 | 20.0 | 0.0 | 475.6 |
| 25 | 92 | 264.7 | 0.0 | 0.0 | 0.0 | 100.0 | 0.0 | 0.0 | 0.0 | 0.0 | 80.9 | 0.0 | 80.9 |
| 27 | 406 | 264.7 | 0.0 | 0.0 | 0.0 | 100.0 | 0.0 | 0.0 | 0.0 | 0.0 | 80.9 | 0.0 | 80.9 |

Thus the process of the present invention is a highly energy- and cost-efficient method for the production of oxygen by the utilization of direct thermal energy. The process is more energy- and cost-efficient than conventional cryogenic air separation technology. In contrast with prior art ion transport membrane processes, the present invention allows independent temperature control of the membrane and gas turbine, thereby thermally delinking each of these key components to allow the most efficient production of oxygen for a given process embodiment. The process may be operated solely for the production of oxygen, but is preferably operated to coproduce steam and/or electricity. In all embodiments of the invention, thermal delinking of the membrane and the gas turbine is the key feature which allows the most efficient overall operation.

The essential characteristics of the present invention are described completely in the foregoing disclosure. One skilled in the art can understand the invention and make various modifications thereto without departing from the basic spirit thereof, and without departing from the scope of the claims which follow.

We claim:

1. A process for recovering oxygen from an oxygen-containing gas mixture comprising the steps of:
   (a) compressing said oxygen-containing gas mixture;
   (b) heating the resulting compressed gas mixture of step (a);
   (c) passing the resulting compressed and heated mixture of step (b) into a membrane separation zone comprising one or more oxygen-selective ion transport membranes, and withdrawing therefrom a hot high-purity oxygen permeate stream and a hot oxygen-containing non-permeate stream;
   (d) further heating said non-permeate stream; and
   (e) passing the further heated non-permeate stream through an expansion turbine to generate shaft power and withdrawing therefrom a turbine exhaust stream;
   wherein the operating temperatures of said membrane separation zone and said expansion turbine are independently maintained such that said membrane separation zone operates in a temperature range above the temperature of said turbine exhaust stream by controlling the rate of heat addition in steps (b) and (d), whereby said membrane separation zone and said expansion turbine are thermally delinked for maximum efficiency in recovering said oxygen.

2. The process of claim 1 which further comprises utilizing at least a portion of said shaft power to provide at least a portion of the power to compress said gas mixture in step (a).

3. The process of claim 1 wherein said further heating of said non-permeate stream in step (d) is accomplished at least in part by combusting a fuel with said non-permeate stream in a first direct-fired burner.

4. The process of claim 3 wherein said heating of the compressed gas mixture in step (b) is accomplished at least in part by combusting a fuel with said gas mixture in a second direct-fired burner, wherein the operating temperatures of said membrane separation zone and said expansion turbine are independently maintained by controlling the firing rates of said first and second direct-fired burners.

5. The process of claim 3 wherein said heating of the compressed gas mixture in step (b) is accomplished at least in part by combusting a fuel with said oxygen-containing non-permeate stream in a second direct-fired burner and passing the burner effluent through a heat exchange zone in indirect heat exchange with said compressed gas mixture, wherein the operating temperatures of said membrane separation zone and said expansion turbine are independently maintained by controlling the firing rates of said first and second direct-fired burners.

6. The process of claim 3 wherein said heating of the compressed gas mixture in step (b) is accomplished in part by indirect heat exchange with said turbine exhaust stream.

7. The process of claim 1 wherein said ion transport membranes are selected from the group consisting of mixed conductor membranes and solid electrolyte membranes.

8. The process of claim 1 which further comprises utilizing at least a portion of said turbine exhaust stream to generate steam which is utilized as an additional product or which is expanded in a turbine to drive an electric generator to produce electricity as an alternate product.

9. The process of claim 1 which further comprises cooling said hot high-purity oxygen permeate stream and withdrawing the resulting cooled stream at a subatmospheric pressure through a vacuum blower to yield a high-purity oxygen product.

10. The process of claim 1 wherein said membrane separation zone is operated at a feed side pressure between 50 and 500 psia.

11. The process of claim 10 wherein said membrane separation zone is operated at a permeate side pressure between 2 and 30 psia.

12. The process of claim 10 wherein said membrane separation zone is operated at a temperature between 800° and 2,100° F. and said expansion turbine is operated at an inlet temperature between 800° and 3,000° F., wherein said membrane separation zone operates at a lower temperature than said expansion turbine inlet temperature.

13. A process for recovering oxygen from an oxygen-containing gas mixture comprising the steps of:
   (a) compressing said oxygen-containing gas mixture;
   (b) dividing the resulting compressed mixture of step (a) into a first and a second compressed gas stream;
   (c) heating said first and second compressed gas streams and combining the resulting heated streams into a combined feed stream;
   (d) passing said combined feed stream into a membrane separation zone comprising one or more oxygen-selective ion transport membranes;
   (e) withdrawing from said membrane separation zone a high-purity oxygen permeate stream and an oxygen-containing nonpermeate stream;
   (f) further heating said non-permeate stream; and
   (g) passing the further heated non-permeate stream through an expansion turbine to generate shaft power and withdrawing therefrom a turbine exhaust stream;
   wherein the operating temperatures of said membrane separation zone and said expansion turbine are independently maintained by controlling the rate of heat addition to each of said first and second compressed gas streams in step (c), whereby said membrane separation zone and said expansion turbine are thermally delinked for optimum efficiency in recovering said oxygen.

14. The process of claim 13 wherein said first compressed gas stream is heated by indirect heat exchange with said high-purity oxygen permeate stream, thereby yielding a cooled high-purity oxygen stream.

15. The process of claim 13 wherein said second compressed gas stream is heated by indirect heat exchange with said oxygen-containing nonpermeate stream.

16. The process of claim 13 wherein the resulting compressed gas mixture of step (a) is heated by indirect heat exchange with said turbine exhaust stream prior to step (b).

17. The process of claim 13 which further comprises utilizing at least a portion of said shaft power to provide at least a portion of the power to compress said gas mixture of step (a).

18. A method of operating a process for recovering oxygen from an oxygen-containing gas mixture which comprises the steps of:

(a) compressing said oxygen-containing gas mixture;

(b) heating the resulting compressed gas mixture of step (a) by combusting said mixture with a fuel in a first direct-fired burner;

(c) passing the resulting compressed and heated stream of step (b) into a membrane separation zone comprising one or more oxygen-selective ion transport membranes, and withdrawing therefrom a hot high-purity oxygen permeate stream and a hot oxygen-containing non-permeate stream;

(d) measuring the temperature of said hot oxygen-containing non-permeate stream, comparing the measured temperature with a first set point temperature, and utilizing the difference between the measured temperature and the first set point temperature to correct the firing rate of said first direct-fired burner, thereby maintaining said first set point temperature;

(e) further heating said non-permeate stream by combusting said stream with a fuel in a second direct-fired burner;

(f) passing the further heated non-permeate stream of step (e) through an expansion turbine to generate shaft power and withdrawing therefrom a turbine exhaust stream; and (g) measuring the temperature of said further heated non-permeate stream prior to said expansion turbine, comparing the measured temperature with a second set point temperature, and utilizing the difference between the measured temperature and the second set point temperature to correct the firing rate of said second direct-fired burner, thereby maintaining said second set point temperature;

whereby the operating temperatures of said membrane separation zone and said expansion turbine are independently maintained, and whereby said membrane separation zone and said expansion turbine are thermally delinked for optimum efficiency in recovering said oxygen.

19. The process of claim 18 which further comprises utilizing at least a portion of said shaft power to provide at least a portion of the power to compress said gas mixture of step (a).

20. The method of claim 18 wherein said resulting compressed gas mixture of step (a) is preheated prior to step (b) by indirect heat exchange with at least a portion of said turbine exhaust stream.

21. A method of operating a process for recovering oxygen from an oxygen-containing gas mixture which comprises the steps of:

(a) compressing said oxygen-containing gas mixture;

(b) heating the resulting compressed gas mixture of step (a) by indirect heat exchange with a hot combustion gas stream, yielding a cooled combustion gas stream;

(c) passing the resulting compressed and heated stream step (b) into a membrane separation zone comprising one or more oxygen-selective ion transport membranes, and withdrawing therefrom a hot high-purity oxygen permeate stream and a hot oxygen-containing non-permeate stream;

(d) combusting said hot oxygen-containing non-permeate stream with a fuel in a first direct-fired burner to yield said hot combustion gas stream;

(e) measuring the temperature of said hot oxygen-containing non-permeate stream, comparing the measured temperature with a first set point temperature, and utilizing the difference between the measured temperature and the first set point temperature to correct the firing rate of said first direct-fired burner, thereby maintaining said first set point temperature;

(f) heating said cooled combustion gas stream by combusting said stream with a fuel in a second direct-fired burner to yield a high temperature combustion product;

(g) passing said high temperature combustion product through an expansion turbine to generate shaft power and withdrawing therefrom a turbine exhaust stream; and (h) measuring the temperature of said high temperature combustion product prior to said expansion turbine, comparing the measured temperature with a second set point temperature, and utilizing the difference between the measured temperature and the second set point temperature to correct the firing rate of said second direct-fired burner, thereby maintaining said second set point temperature;

whereby the operating temperatures of said membrane separation zone and said expansion turbine are independently maintained, and whereby said membrane separation zone and said expansion turbine are thermally delinked for optimum efficiency in recovering said oxygen.

22. The process of claim 21 which further comprises utilizing at least a portion of said shaft power to provide at least a portion of the power to compress said gas mixture of step (a).

23. The method of claim 21 wherein said resulting compressed gas mixture of step (a) is preheated prior to step (b) by indirect heat exchange with at least a portion of said turbine exhaust stream.

* * * * *